Dec. 20, 1955　　　　J. D. HATCHER　　　　2,727,492
QUANTITY CONTROLLED AUTOMATIC POULTRY WATER TROUGH
Filed May 31, 1952
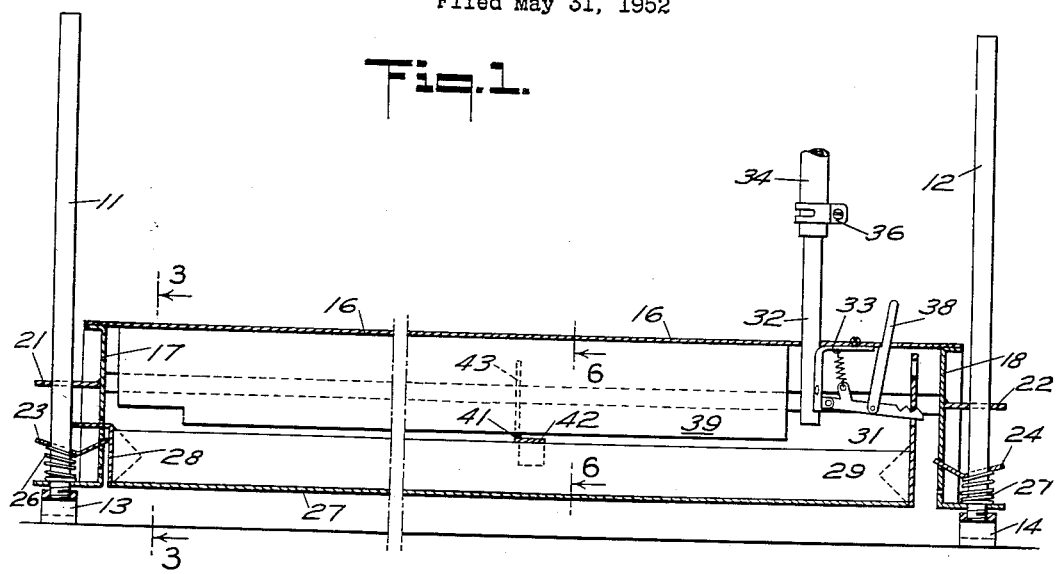
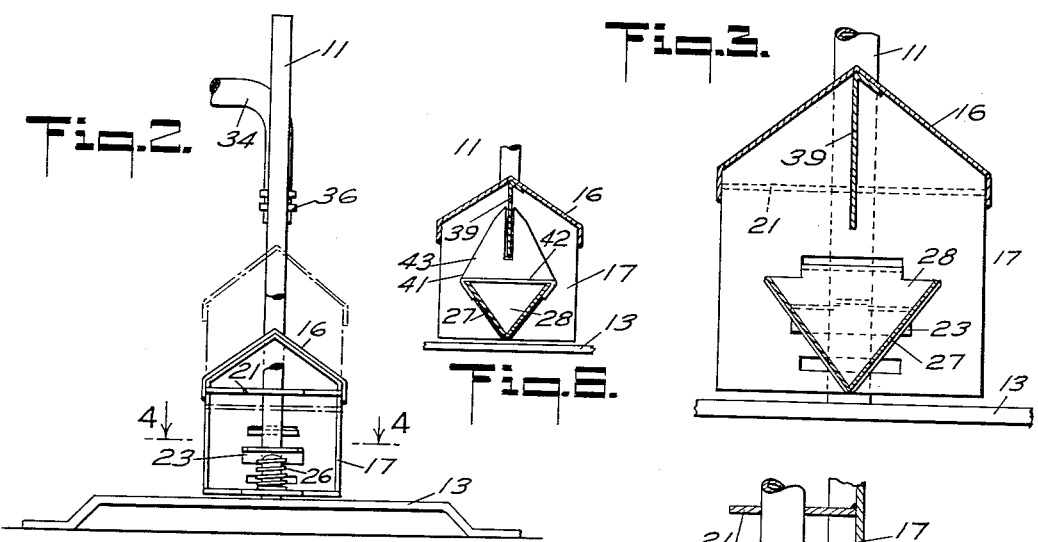
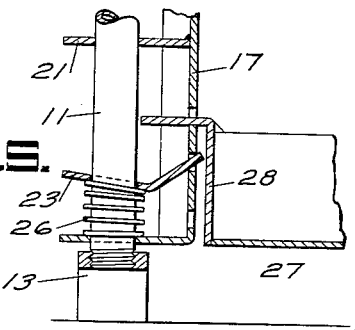
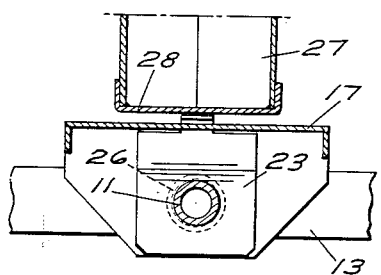
INVENTOR
JAMES D. HATCHER
BY Gardner & Zimmerman
ATTORNEYS United States Patent Office 2,727,492
Patented Dec. 20, 1955

2,727,492
QUANTITY CONTROLLED AUTOMATIC POULTRY WATER TROUGH

James D. Hatcher, Campbell, Calif.

Application May 31, 1952, Serial No. 291,017

3 Claims. (Cl. 119—81)

The present invention relates to an automatic fountain adapted for the watering of poultry and is particularly designed for use in connection with the raising of chickens or the like inasmuch as provision is made to accommodate the watering of chickens of increasing size without sacrificing any of the advantages attendant to the invention.

While there have been developed innumerable automatic watering devices for poultry and livestock ranging from a simple dripping faucet to very complicated devices there remains to be presented a simple and safe device which is adaptable for use with any size poultry and which in addition to being wholly automatic completely protects the water from contamination. Particular care must be taken in the raising of very small chickens, for example, and in this respect the present invention combines all of the above features. The water provided is available only for drinking and the structure of the invention precludes any possibility of drowning of baby chicks or deposit by the chicks of foreign matter in the water, and yet the same fountain is adaptable for use by chickens or other poultry of any size. Also, the automatic watering feature is positively acting and extremely reliable, needing no complicated adjustment with variations in position of other portions of the fountain. Further, the automatic fountain has exceptional structural rigidity to withstand the pressure of poultry thereon and to provide long life, and in addition the fountain is adapted for use as a barrier or partition in such as a brooder house while at the same time providing all of the above features and advantages to both sides of the area so divided.

It is accordingly an object of the present invention to provide an improved automatic fountain for poultry or the like.

It is another object of the present invention to provide an improved automatic fountain adjustable to water poultry of all sizes while completely protecting the water from the entry of foreign matter or of poultry.

It is still another object of the present invention to provide an improved automatic fountain having a permanently secured water valve, adjustable access opening, adjustable height, rigid construction, and complete inaccessibility of one side to the other.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The exemplary form of the invention is illustrated in the drawing by various figures as follows:

Figure 1, showing the automatic fountain in longitudinal cross section with the center portion removed for scaling purposes.

Figure 2, showing the fountain in end elevation.

Figure 3, showing a cross sectional view of Figure 1 at 3—3 thereof.

Figure 4, showing a partial cross sectional view of Figure 2 at 4—4 thereof.

Figure 5, showing an enlarged sectional view of the trough end suspension but indicating the clip in its hood releasing position; and Figure 6, showing a cross sectional view drawn to a reduced scale of Figure 1 at 6—6 thereof.

Considering now the invention in some detail and referring to the drawing, there is provided a pair of upright standards 11 and 12 which are each secured to individual feet or bases 13 and 14 respectively as by threaded engagement therewith. Supported between standards 11 and 12 is a hood 16 which in section has the shape of an inverted V. Disposed at either end of hood 16 are support plates 17 and 18 which each consist of a vertical section with a right angle bend at the bottom to present an L configuration in end view. In addition, there is attached to support plates 17 and 18, guide plates 21 and 22 which are secured to the vertical portion of plates 17 and 18 and extend normal thereto above and parallel to the horizontal portion of plates 17 and 18. Guide plates 21 and 22 and the corresponding horizontal portions of support plates 17 and 18 are provided with aligned apertures of a diameter slightly greater than that of standards 11 and 12, and in assembly standards 11 and 12 are disposed through the aligned apertures of support plates 17 and 18 and guide plates 21 and 22 respectively, as shown in Figure 1.

Hood 16 is mounted upon support plates 17 and 18 at each end of the hood and this may be readily accomplished by bending the top corners of the vertical portions of support plates 17 and 18 ninety degrees inward toward hood 16 whereby hood 16 rests upon these corners; and securing the corners so bent to hood 16 as by welding. From the above it will be seen that hood 16 is mounted by support plates 17 and 18 between standards 11 and 12 for vertical motion along the standards by the slidable engagement of standards 11 and 12 with guide plates 21 and 22 and the horizontal extensions of plates 17 and 18. In order to maintain hood 16 at any desired height on standards 11 and 12 there are provided a pair of identical clips 23 and 24, of which clip 23 operates upon standard 11 and clip 24 on standard 12. Clip 23, for example, consists of a plate having a bend therein to present in end view a wide angle V, as best shown in Figure 5, and being provided with an aperture through one portion thereof of a diameter slightly greater than that of standard 11. Support plates 17 and 18 are each provided with a slot disposed a short distance from the bottom ends thereof and extending horizontally to receive the end of the unapertured portion of clips 23 and 24 respectively. Springs 26 and 27 are disposed about standards 11 and 12 respectively between the horizontal portions of support plates 17 and 18 and clips 23 and 24. These springs are compressed between the clip and the horizontal portion of the associated support plate to urge same apart whereby clips 23 and 24, being constrained to move only along standards 11 and 12 respectively and held by engagement with the slots in support plates 17 and 18, pivot and bear tightly upon the standards. Thus, as will be most clearly seen in Figure 5, spring 26 forces clip 23 to cock upon standard 11 and to thus tightly engage same for preventing movement of support plate along standard 11. Movement of support plate 17 is accomplished by forcing the outer ends of clip 23 and the horizontal portion of support plate 17 together, which although further compressing spring 26, moves the aperture on clip 23 into alignment with standard 11 and prevents bending so that free motion of support plate 17 along standard 11 is allowed.

In addition to the above mentioned elements there are provided various other operative members of the fountain including a trough 27 having a V-shaped cross section and disposed immediately below hood 16. One end of trough 27 consists of an angle plate 28 having a right angle bend therein and connection may be made between end 28 and the sides of trough 27 by folding the corners of one portion of end 28 at right angles thereto to form a V into which the sides of trough 27 fit and are secured as by soldering, as shown in Figures 1 and 3. A pair of horizontal slots are provided in the vertical portion of support plate 17, preferably some distance apart such as one and one-half inches, and the horizontal or bent portion of trough end 28 is adapted for disposition in one or the other of these slots. The horizontal portion of trough end 28 may have a reduced width for easy insertion in the slots of support plate 17, as shown in Figure 3, and movement of end 28 from one slot to another in support plate 17 changes the distance between hood 16 and trough 27. It has been determined that to afford one day old chicks proper access to the trough, the spacing between the trough and hood should be approximately two inches. This is the spacing when the trough is in its uppermost position relative to the hood, and thus when the trough is placed in its lowermost position relative to the hood, the spacing will have become increased to approximately three and one-half inches. To accommodate baby chicks one day old, the top of the trough should be about two inches above the ground, and as will be understood as the chicks or chickens grow older the trough and the hood may be raised to any height desired.

At the opposite end of trough 27 from end 28 there is provided a second trough end 29 which may be secured to the sides of trough 27 in the same manner as end 28 and which extends vertically upward from trough 27. Trough end 29 is provided with a pair of apertures therein above the sides of trough 27 and separated the same distance as the apertures in support plate 17 which are engaged by trough end 28. Trough 27 is supported at end 29 by a lever arm 31 of a valve 32, which includes an elongated cylindrical body extending through hood 16 and rigidly attached thereto as by a bracket 33 held in place by any suitable means such as screws or bolts. Attached to the top of valve 32 is a water hose 34 for supplying water to trough 27 through valve 32 and secured thereto in fluid tight relation by means such as hose clamp 36. Valve lever arm 31 is pivotally mounted upon the valve body and engages a valve stem internal thereto for controlling the valve opening. Lever arm 31 also engages trough end 29 by engagement with one of the apertures therethrough and a number of notches may be formed in lever arm 31 for positive latching of arm 31 to trough end 29, as shown. A tension spring 37 is mounted upon bracket 33 on the under side of hood 16 and is connected at its opposite end to lever arm 31 intermediate the pivotal mounting thereof and the engagement of lever arm 31 with trough end 29 to urge lever arm 31 and attached trough 27 upwards. Valve 32 preferably comprises a double acting valve which is open only over an intermediate range of positions of lever arm 31 and which closes upon a large displacement of lever arm 31 in either direction. Thus with a proper choice of the size of suspension spring 37, or by adjustment of the tension thereof, the weight of trough 27 and a full supply of water therein will pull lever arm 31 down to close valve 32 and prevent water from flowing into trough 27. With a decrease in the amount of water in trough 27 over a predetermined amount the tension of spring 37 will overcome the trough weight and will raise lever arm 31 to an intermediate position wherein valve 32 is open to pass water into trough 27. This action thus automatically regulates the amount of water in trough 27. The removal of all water from trough 27, as for cleaning of the trough, allows spring 37 to move lever arm 31 to its maximum upward displacement, thus automatically shutting off valve 32 to prevent undesired water flow. In this connection there may be further provided a valve handle 38 pivotally engaging lever arm 31 and extending upward therefrom at an angle through an opening in hood 16. Valve handle 37 has a shoulder thereon for engagement with the under surface of hood 16 when handle 38 is moved toward a vertical position and this shoulder is displaced from lever arm 31 so that engagement of the shoulder on handle 38 may only be made when lever arm 31 is in an intermediate position. By this means handle 38 provides a convenient manual valve control for filling trough 27, as after cleaning or installation, for the depression of handle 38 causes lever arm 31 to open valve 32. Engagement of the shoulder of handle 38 with hood 16 may then be made by pivoting handle 38 and valve 31 is thus held open until the weight of trough 27 pulls lever arm 31 down further than it is held by handle 38 whereupon handle 38 falls further out of vertical so that the shoulder thereof is no longer in position to engage hood 16.

In order to limit the latitudinal area of trough 27 available to chickens or the like and further to positively separate the fountain into two mutually inaccessible portions there is provided a center line baffle 39 which may take the form of a long sheet or plate of metal or the like disposed along the center line of hood 16 and depending therefrom. Baffle 39 is secured to the inner surface of hood 16 at the apex thereof as by providing a bent edge upon baffle 39 which rests against a part of one side of hood 16 internal thereto, as shown in Figure 3, and is joined thereto as by welding. Baffle 39 extends downwardly from hood almost to the top of trough 27 and extends from end 28 of trough 27 to the vicinity of valve 32 which effectively divides the remainder of the length of the fountain into separate parts.

Inasmuch as it is contemplated that the platelike elements of the fountain will be formed of relatively light materials such as sheet metal or the like and in view of the advisability of making the fountain of considerable length to accommodate a large number of fowl, a problem of structural rigidity arises. In the present invention this problem is completely answered by the provision of one or more support members 41, the actual number employed being determined by the length of the fountain. Support member 41 includes a strap 42 of relatively small width extending laterally across trough 27 and having the ends thereof turned under at the angle of the sides of trough 27 to grip same on the outside thereof. Strap 42 is rigidly secured to trough 27 as by welding of the ends of strap 42 to the sides of trough 27.

Extending vertically upward from strap 42 and laterally of trough 27 and hood 16 is a flange 43 which may have somewhat of an inverted V shape, as shown in Figure 6. Flange 43 has a central slot therein extending from the top thereof downward to accommodate baffle plate 39 in slidable relation. The dimensions of flange 43 and the slot therein is determined by the distance between trough 27 and hood 16 in the extreme relative positions thereof as baffle 39 preferably totally engages the slot in flange 43 when hood 16 and trough 27 are positioned closest together and also in this position flange 43 should extend substantially to hood 16 so that it will engage a substantial portion of baffle 39 when trough 27 and hood 16 are at maximum separation. Support member 41 while including a number of elements may be made in a single piece of metal by simple sheet metal techniques and is so shown on the drawing. It will be appreciated that support member 41 not only improves the rigidity of trough 27 but also counteracts the tendency of baffle 39 to bend owing to its length and prevents distortion of baffle 39 by poultry so that the barrier action thereof is at all times effective.

The operation of the invention has been set out above in connection with the description of the individual elements thereof. However, for maximum clarity there follows a brief description of overall operation including a redefinition of the various adjustments and their interrelation. Commencing with small poultry, such as baby chicks, the fountain is disposed at its lowest vertical level by setting support plates 17 and 18 substantially upon bases 13 and 14 at the bottom of standards 11 and 12. Trough 27 is placed in its upper position relative to hood 16 by inserting trough end 28 in the upper slot of support plate 17 and valve lever arm 31 in the lower aperture of trough end 29, this position being illustrated in Figure 1. Trough 27 is filled with water to a predetermined level through valve 32 from some convenient source of water (not shown) attached to hose 34 and this operation may be accomplished with valve handle 38, as set out above. With trough 27 filled valve 32 is closed and the fountain is available for use while acting as a complete barrier between opposite sides thereof and further protecting the water from contamination and the poultry from immersion. In operation valve 32 operates, through lever arm 31 suspending trough 27, to continuously maintain a predetermined water level in trough 27 in accordance with the weight of trough 27 and contained water. As the chickens grow the entire hood and trough assembly may be raised so as to afford the most accessible position of the water for the poultry. This adjustment is accomplished by compressing springs 25 and 26 between clips 23 and 24 and the horizontal portions of support plates 17 and 18. This allows the fountain to move freely up and down standards 11 and 12 with guide plates 21 and 22 preventing tipping of the fountain during movement and insuring a level disposition thereof at all positions. Release of springs 25 and 26 forces clips 23 and 24 into contact with standards 11 and 12 to maintain the fountain at any desired height, and the mounting of valve 32 upon fountain hood 16 removes the necessity readjusting or realigning valve 32 with movement of the fountain. As the chickens reach some larger size the relative disposition of hood 16 and trough 27 may be varied to provide greater room for the chickens to drink from trough 27 and this is accomplished by moving the horizontal portion of trough end 28 from the upper to the lower aperture of support plate 17 and moving valve lever arm 31 from the top to the bottom aperture of trough end 29. This adjustment does not affect the preset adjustment of valve 32 so that no manual control thereof is required. It will be appreciated in connection with the relative displacement of trough 27 and hood 16 that any number of slots may be formed in support plate 17 and apertures in trough end 29 to provide any desired spacing; there being illustrated two positions merely as an example.

The present invention will be seen from the foregoing to clearly accomplish the above enumerated objects and to possess numerous advantages including those specifically set forth. Inasmuch as the invention has been described only with respect to a single preferred embodiment no limitation is intended thereby but instead reference is made to the following claims for a complete definition of the invention.

I claim:

1. An improved automatic fountain comprising a pair of vertical standards, a hood disposed intermediate said standards, a pair of support plates connected one to each end of said hood and slidably engaging said standards, locking means engaging said standards and said support plates whereby said hood is vertically adjustable, a trough pivotally engaging one of said support plates and at selected vertical positions thereon below said hood, and a valve mounted upon said hood and directed into said trough, said valve having a control member spring mounted to said hood and engaging the free end of said trough whereby the operation of said valve is controlled by the amount of water in said trough.

2. An improved automatic fountain as claimed in claim 1 further defined by the pivotal mounting of said trough and the engagement of said trough and said valve control member being adjustable to vary the displacement of said trough from said hood.

3. An improved automatic fountain comprising a pair of vertical standards, a pair of support plates each slidably engaging one of said standards, a pair of clips disposed one about each of said standards and engaging the associated support plates, a pair of springs disposed one about each standard intermediate said clips and support plates in compression to lock said support plates upon said standards at variable positions, a hood extending between said standards and secured at either end to one of said support plates, a valve having a lever arm and secured to said hood to discharge downwardly, a suspension spring connected between said hood and said valve lever arm, and a trough having one end extended and multiply apertured for adjustable engagement with said valve lever arm and the other end extended to pivotally engage at adjustable points one of said support plates whereby the vertical position of said trough and hood is adjustable and the relative disposition of said trough and hood is adjustable.

References Cited in the file of this patent
UNITED STATES PATENTS

| | | |
|---|---|---|
| 1,771,947 | Allman et al. | July 29, 1930 |
| 1,881,023 | Hoeft | Oct. 4, 1932 |
| 1,980,631 | Overholt | Nov. 13, 1934 |
| 2,011,684 | Martin | Aug. 20, 1935 |
| 2,361,598 | Calhoon | Oct. 31, 1944 |
| 2,541,622 | Toadvine | Feb. 13, 1951 |
| 2,545,105 | Niskala et al. | Mar. 13, 1951 |
| 2,626,724 | Smallegan | Jan. 27, 1953 |
| 2,703,098 | Smallegan | Mar. 1, 1955 |